April 16, 1929.  C. L. WHITCHER  1,709,384
HAY LOADER
Filed Dec. 15, 1924  3 Sheets-Sheet 1
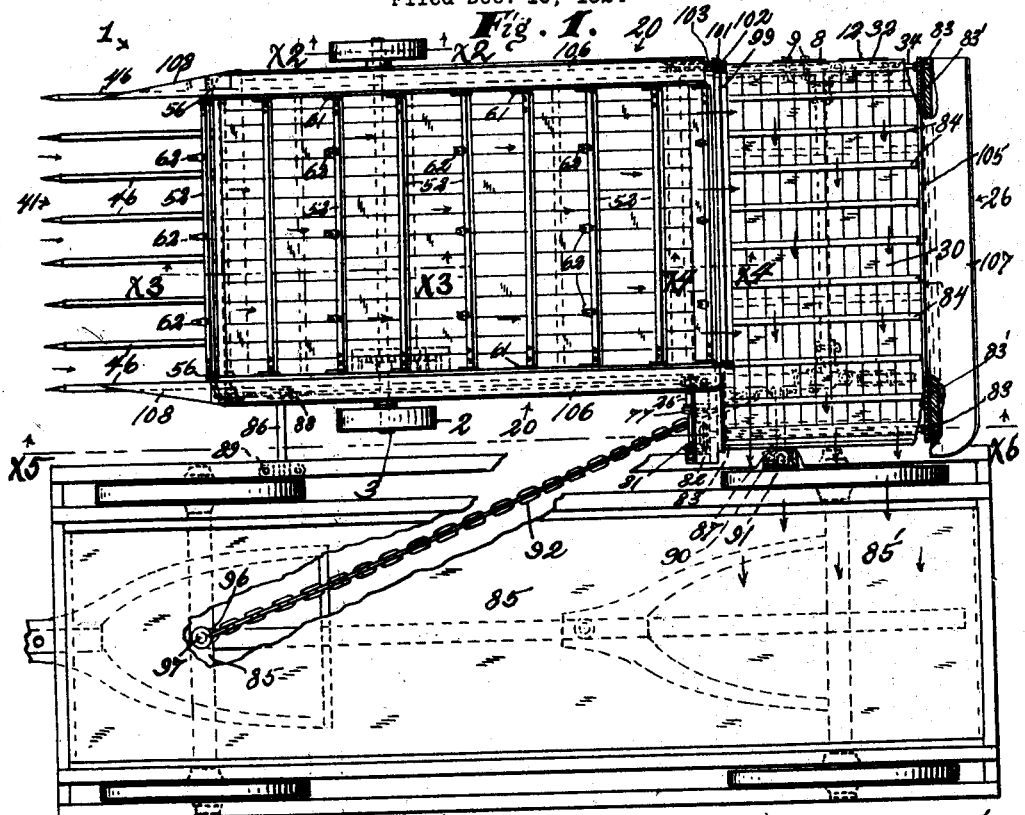
Witness:
W. M. Gentle.
Inventor.
Charles L. Whitcher.
by James R. Townsend
his atty

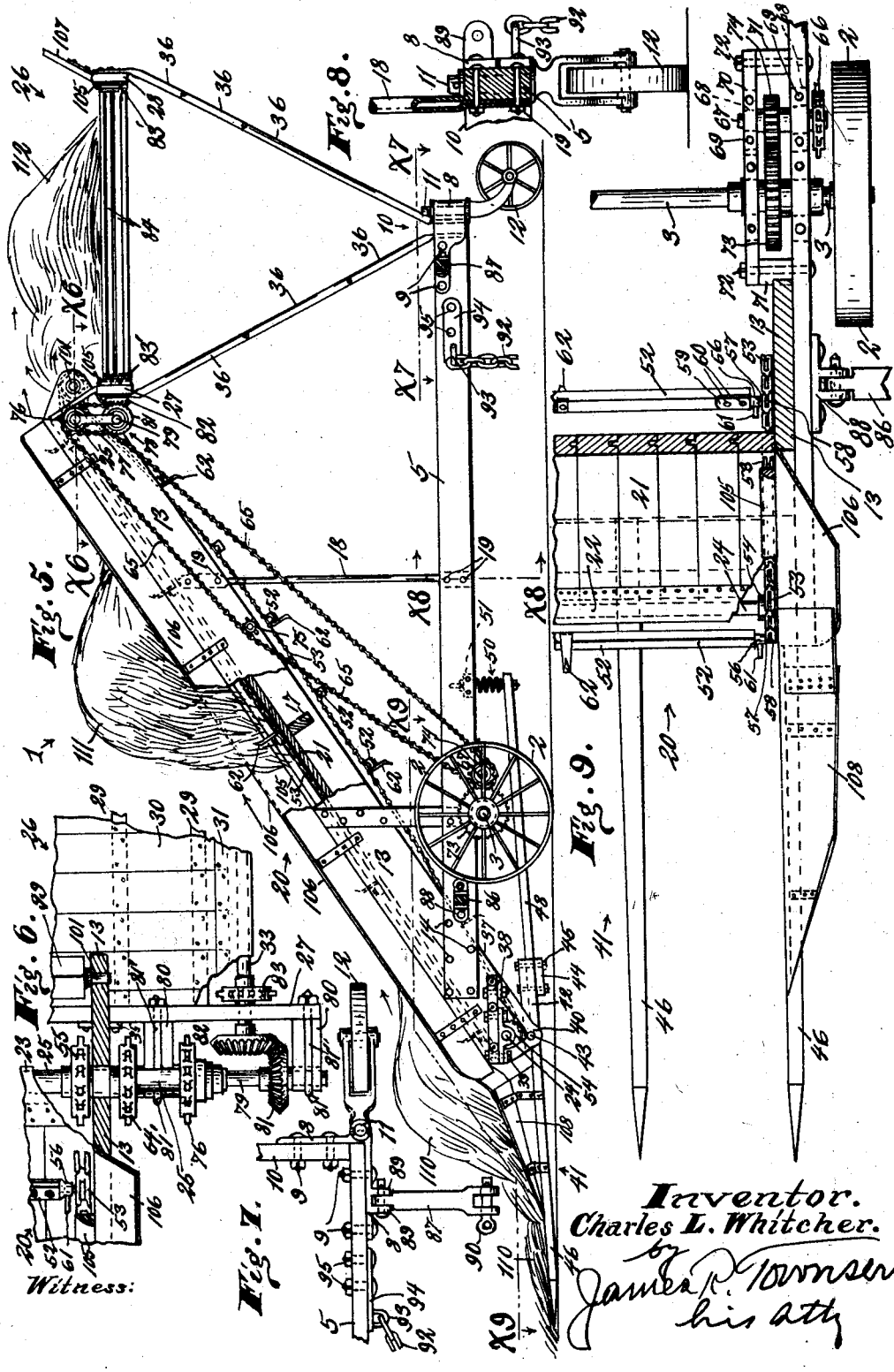

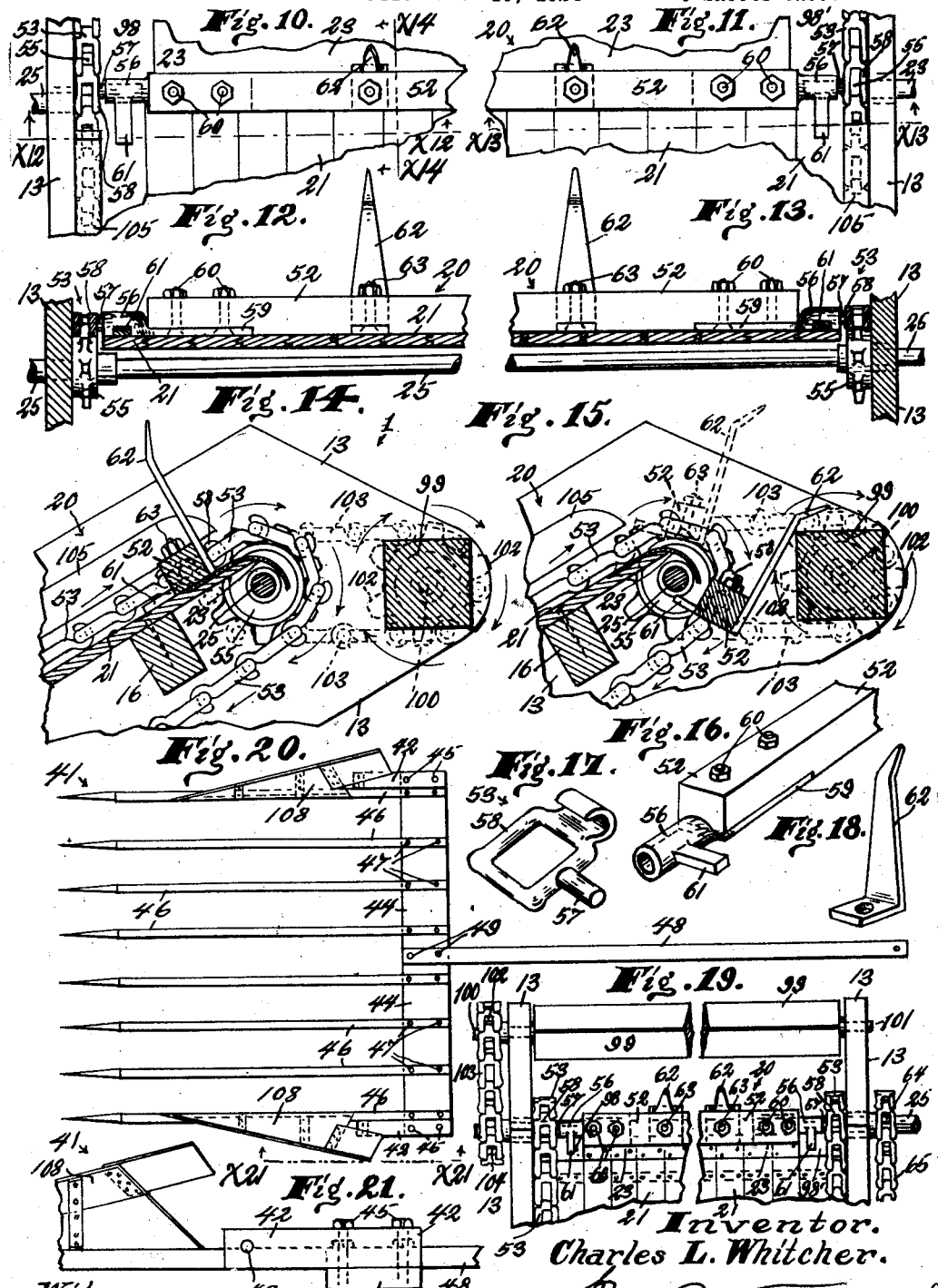

Patented Apr. 16, 1929.

1,709,384

UNITED STATES PATENT OFFICE.

CHARLES L. WHITCHER, OF SANTA BARBARA, CALIFORNIA.

HAY LOADER.

Application filed December 15, 1924. Serial No. 755,904.

An object of this invention is to provide a hay loader that is adapted to travel parallel with and be propelled by a vehicle and operated to transfer grass, hay, straw, vines or fodder laying in swaths, windrows or shocks on the ground to a hay bed.

An object of the invention is to provide a simple and efficient means for transferring cereal plants from swaths, windrows or shocks to a hay bed, and to accomplish the transfer of the material without greatly agitating, breaking the straw, vines or shattering the seed from the plants. To that end, I provide a means for gliding under the swaths, windrows or shocks and elevating the plants to a position to be discharged into a hay bed; which transfer as previously stated is accomplished with a minimum amount of agitation so that practically all of the seed can be saved.

As is well known, a large quantity of the seed of cereal plants is lost by rough handling of the dried hay, straw or vines in loading the material from swaths, windrows or shocks to a hay bed for transporting from the field to a destination which may be a mow, stack, silage or to a threshing machine where the cereal is to be separated from the straw, vines or fodder; and an object of the invention is to provide a simple and efficient means for handling the material in loading so as to prevent waste.

An object of the invention is to provide a hay loader that can be easily and quickly attached to and detached from a hay bed. To that end, I provide a loader with side attaching means so that a wagon can be driven along the side of a loader in position to be connected thereto. Heretofore hay loaders have been constructed so that they are attachable only to the rear end of a wagon; so that it has been necessary to first drive a wagon to a position considerably in advance of a loader after which it is backed to a position to be attached; which movements of the wagon require considerable time and trouble to accomplish, and an object of the invention is to save time and to eliminate unnecessary trouble.

Another object of the invention is to provide a hay loader that is adapted to be propelled alongside of and parallel with a vehicle, so that it can be moved into position to gather grass, hay or plants from swaths, windrows, or shocks in a field without driving the vehicle over the material.

Heretofore it has been impractical to load windrows and shocks from the ground to a hay wagon by means of a trailing loader on account of the low draft of the wagon, the axles of which are in a position to engage and drag down the windrows or shocks; and an object of the invention is to provide a simple and efficient means for loading high windrows and shocks from a field to a wagon.

A feature of the invention is shown in the means employed for first lifting the grass, hay, straw or fodder from the ground into a position to be engaged by an elevator; which means comprises a pivotally mounted fork having inclined tines adapted to travel in advance of the elevator in position to gather substantially all the material in the path of the fork and lift it into position to be engaged by a conveyor of the elevator.

Another feature of the invention is shown in the novel means at the discharge end of the elevator for disengaging the fingers of the conveyor bar from the hay and to wipe them clean of the material as it is discharged from the elevator to the cross conveyor.

Features of the invention are shown in the construction, combination and arrangement of parts whereby a hay loader is provided that is simple and durable in construction and very efficient in operation.

Other objects, advantages and features of invention may appear from the accompanying drawings, the subjoined detailed description and the appended claims.

The accompanying drawings illustrate the invention.

Figure 1 is a fragmental plan view of a hay loader constructed in accordance with this invention, and showing it attached to a hay wagon in position to be operated; and also showing part of the wagon bed broken away to show the chain hitch between the loader and the wagon.

Fig. 2 is an enlarged section on line $x^2$, Fig. 1, showing a detail construction of a differential ratchet connected to the drive wheels.

Fig. 3 is an enlarged fragmental sectional view on line $x^3$, Fig. 1, showing the loader in operation elevating a shock of hay.

Fig. 4 is an enlarged fragmental view on line $x^4$, Fig. 1, showing a detail of the upper end of the elevator adjacent to the cross conveyor.

Fig. 5 is an enlarged fragmental sectional view on line $x^5$, Fig. 1, showing the hay loader in side elevation and in operation lifting hay from the ground, elevating a shock and discharging a shock from the elevator to the cross conveyor.

Fig. 6 is an enlarged fragmental section on line $x^6$, Fig. 5, showing in detail the means for driving the cross conveyor by rotation of the upper shaft of the elevator.

Fig. 7 is a plan view of a rear corner of the loader frame showing a detail of one of the castor wheels for supporting the rear of the frame, a plan view of one of the spacer bars and the loader draw bar.

Fig. 8 is an enlarged fragmental cross section on line $x^8$, Fig. 5, showing a detail of the pipe support for the elevator; and also showing a front view of a castor wheel and associated parts.

Fig. 9 is an enlarged fragmental section on line $x^9$, Fig. 5, showing a detailed construction of the front end of the loader together with the elevator driving means.

Fig. 10 is an enlarged fragmental plan view of an upper left-hand portion of the elevator; the cross conveyor being omitted for the sake of clearness.

Fig. 11 is an enlarged fragmental plan view of an upper right hand portion of the elevator; also omitting the cross conveyor.

Fig. 12 is a fragmental section on line $x^{12}$, Fig. 10.

Fig. 13 is a fragmental section on line $x^{13}$, Fig. 10.

Fig. 14 is an enlarged fragmental section on line $x^{14}$, Fig. 10, showing a detail of the upper end of the elevator and the rotary wiper bar that is arranged to remove the material from the elevator fingers; the parts of the cross conveyor being omitted.

Fig. 15 is a view analogous to Fig. 14 showing an elevator finger engaging the wiper bar that is arranged to rotate in the direction of the arrows so as to remove any material from the fingers that might be inclined to stick to them as they are drawn down between the elevator shaft and rotary bar.

Fig. 16 is a perspective view of a fragmental end portion of one of the conveyor bars showing a bearing for pivotally connecting it to a spindle carried by a conveyor chain.

Fig. 17 is a perspective view of one of the spindle bearing chain links, showing a spindle on which one of the carrier bar bearings is adapted to be mounted.

Fig. 18 is a perspective view of one of the elevator fingers detached from the conveyor bar.

Fig. 19 is a fragmental plan view of the upper end of the elevator; with the parts of the cross conveyor omitted for the sake of clearness in showing the discharge end of the elevator.

Fig. 20 is a plan view of the loader fork detached from the appliance.

Fig. 21 is an edge view of a center portion of the fork as viewed from the line $x^{21}$, Fig. 20; showing a side elevation of one of the pivot blocks by which the fork is pivotally connected to the loader frame.

The hay loader 1 is provided with front drive wheels 2 that are loosely mounted and in driving connection with a main drive shaft 3 by means of the differential ratchets 4 that are arranged in the hubs of the wheels 2 as best shown in Fig. 2, so that the wheels 2 can differentiate in consumating a turn in either direction and also drive the shaft 3 when the hay loader is being propelled in a forward direction.

Also by the arrangement of the differential ratchets relative to the wheels the hay loader can be moved in a rear direction without actuating the drive shaft 3.

Longitudinal beams 5 are arranged above and adjacent the ends of the shaft 3, and are connected thereto by bearings 6 and bolts 7; and the rear ends of these beams are connected by brackets 8 and bolts 9 to a cross bar 10; and spindles 11 of castor wheels 12 are pivotally connected to the brackets 8; and the wheels are arranged to support the rear end of the loader 1.

Inclined beams 13 are secured by bolts 14 to the front ends of the beams 5 and are arranged to extend upward at a desired angle preferably about thirty five degrees; and adjacent their upper and lower ends they are connected by cross plates 15, 16; and intermediate of these cross plates are arranged other cross plates 17.

The elevated ends of the beams 13 are supported by rods 18 connected to beams 5 and 13 by bolts 19 and preferably the rods 18 are pipes with flattened ends as shown in the drawings.

The elevator 20 is provided with a slideway 21 that is formed between the beams 13 by means of flooring secured to the cross plates 15, 16, 17; and preferably metal guards 22, 23 are secured to the intake and discharge ends of the slideway 20 and arranged to extend over and partly around the shafts 24, 25 journalled into the beams 13 adjacent their lower and upper end. The purpose of the guards 22, 23 is to prevent material such as grass, hay, straw or fodder from being wound onto the shafts when they are rotated.

A cross conveyor 26 is arranged under and adjacent the discharge end of the elevator 20.

It comprises parallel side beams 27, 28 connected by suitable cross plates 29 to which a slide 30 is secured as best shown in Fig. 6.

Metal guards 31, 32 are secured to the ends of the slide 30 and are arranged to extend over and partly surround the shafts 33, 34 journalled through the ends of the beams 27, 28.

Beam 27 is secured to the beam 13 by suitable brackets 35; and the conveyor 26 is additionally supported by pairs of inclined rods 36 that have their lower ends secured to the cross bar 10.

The upper ends of these rods are secured to the beams 27, 28 and are arranged to hold the conveyor 26 in a fixed position relative to the discharge end of the elevator 20.

The lower ends 37 of the beams 13 extend down below the level of the beams 5; and to the ends 37 are secured blocks 38 that carry the bearings 39 for the shaft 24 and also bearing straps 40 that are adapted to support the fork 41.

Fork 41 is provided with side bearing blocks 42 that are pivotally connected to the straps 40 by pins 43.

The fork 41 is preferably constructed as best shown in Figs. 3, 20, 21. As seen therein there is a cross plate 44 to the ends of which the bearing blocks 42 are secured by bolts 45; and intermediate of these blocks are arranged the tines 46 that are spaced equidistant apart and have their rear ends secured by bolts 47 to the plate 44.

The fork handle 48 has its forward end secured centrally by bolts 49 to the plate 44; and the rear end of this handle is secured by a spring connection 50 to a cross bar 51 that is secured between the beam 5.

The fork 41 is pivotally mounted on the pins 43 and the associated parts arranged so that normally the sharpened ends of the tines 46 are yieldingly held close to the surface of the ground and inclined upward toward the rear of the appliance so that when in operation they are adapted to glide under the material and elevate it into position to be passed onto the intake end of the slide 21 of the elevator 20; and also the fork is mounted so that it can readily yield when engaging raised places on the surface of the ground.

The elevator 20 is provided with movable cross bars 52 that are carried by sprocket chains 53 arranged on sprockets 54, 55 that are secured to the shafts 24, 25; and arranged so that the chains are spaced apart by the cross bars 52.

The connection of the bars 52 to the chains 53 is best illustrated in Figs. 10 to 17 inclusive. As seen therein the bars 52 have end bearings 56 provided with sockets into which spindles 57 are adapted to extend; and the spindles 57 are integral with spaced links 58 in the chains 53.

Preferably the bearings 56 are formed of short pieces of pipe that have end portions 59 hammered down and secured to the bars 52 by bolts 60.

The bars 52 while being moved over the face of the slide 21 are prevented from axial rotation by means of gliders 61 that are integral with the bearings 56 and which are arranged to extend at right angles to the bars and to engage the slide and thereby prevent rotation of the bearings 56 on the spindles 57.

Every other one of the bars 52 are provided with fingers 62 that preferably are made of sheet metal strips that are tapered, bent to form and secured by bolts 63 to the bars 52 as shown in the drawings; and the purpose of the fingers is to engage the material and aid the bars 52 in moving it upwards over the slide 21.

A means is provided for driving the chains 53 to move the bars 52.

The driver shaft 25 is extended through the left hand beam 13 and is provided with a sprocket wheel 64 that is connected by a drive chain 65 with a sprocket 66 on a countershaft 67 that has one end supported by a bearing 68 secured by bolts 69 to the beam 5 and the other end of the counter shaft is supported by a similar bearing and bolts secured to a counter bar 70 that is arranged parallel with the left hand beam 5.

The bar 70 is spaced away from and secured to the bar 5 by blocks 71 and bolts 72.

The shaft 67 is driven by rotation of the shaft 3 that is provided with a gear 73 meshing with a pinion 74 on the shaft 67, see Fig. 9.

An idler 75 is secured to the left hand beam 13 in position to be engaged with the chain 65 and hold it taut when being driven.

A driving connection is provided between the shafts 25 and 33 whereby the actuation of the main drive shaft 3 operates the conveyors of the elevator 20 and cross conveyor 26.

The shaft 25 is extended and provided with a sprocket 76 that is connected by a chain 77 to a sprocket 78 on a counter-shaft 79 that is secured to the beam 27 by blocks 80 and bolts 81'.

The shaft 79 is provided with a bevel gear 81 that meshes with a bevel pinion 82 on the shaft 33 so that when the main drive shaft 3 is rotated in a forward direction it will actuate the conveyors of the elevator 20 and cross conveyor 26.

The cross conveyor 26 is provided with sprockets 83 and chains 83' and cross bars 84 that are substantially like the chain sprockets and cross bars of the conveyors of elevator 20; and therefore these parts are not shown and described in detail, except to state that the parts are constructed and arranged to drive the shaft 33 in a direction that will move the bars 84 over the face 30 of the cross conveyors 26 to discharge material therefrom onto a hay wagon 85.

The hay loader 1 is attached to the wagon 85 by means of front and rear spacing bars 86, 87. These bars are substantially alike. Bar 86 has one end pivotally connected to a bracket 88 secured to the left hand beam 5; and its other end pivotally connected to a clevis 89 secured to the hay bed 85'. Bar 87 has one end pivotally connected to lugs 89 integral with the left hand bracket 8, and the other end of this bar is pivotally connected by a pin 90 to another clevis 91 secured to the hay bed 85'. The construction and functions of the clevises 89, 91 are well understood and are therefore not shown or described in detail; it being understood that the bars 86, 87 are detachably and pivotally connected to the loader and hay bed and that they function to space the two appliances apart while in operation loading the hay bed.

A draft chain 92 has one end connected to a ring 93 that is attached to a draw bar 94 that is secured by bolts 95 to the left hand beam 5 adjacent its rear end; and the forward end of the chain 92 has a link 96 through which the wagon king pin 97 is extended.

By the foregoing construction and arrangement of the bars 86, 87 and chain 92 the loader 1 can be attached to the wagon 85 so that when the latter is propelled the loader will also be made to move in a course parallel to and in time with the wagon; and through the forward rotation of the wheels 2, the shaft 3 will be driven to actuate the conveyors of the elevator 20 and the cross conveyor 26 to transport material from the ground to a wagon bed; and after it is loaded the chain 92 and bars 86, 87 can be disconnected so that the wagon can be driven away with the load and the loader left in position to be hitched to another wagon.

In operation the fork 41 is pivotally mounted so that its tines are inclined downward with the sharpened points arranged to glide over and near to the surface of the ground so that by a forward movement they can be forced under swaths, windrows or shocks to lift the material into position to be engaged by the conveyor of the elevator and carried upward toward the discharge end of the elevator 20.

As previously stated the bars 52 are held from axial rotation while moving over the slide 21 by means of the gliders 61, so that they will not roll and thereby become entangled with the material; and also so that the fingers 62 will be held in a position best adapted to engage the material and help to transport it up the slide.

The upper end of the slide 21 is cut away at 98, 98' so as to release the gliders 61 when the bars 52 have reached the limit of their upward movement; see Fig. 19. And when the gliders reach the spaces 98, 98', the bars 52 are free to move on their axis to permit their fingers 62 to be withdrawn from the material and to be moved down between the shaft 25 and a rotary wiper bar 99 that has end spindles 100, 101 journalled through the beams 13.

A sprocket 102 is secured to the spindle 100 and it is connected by a chain 103 to a sprocket 104 secured to an extended end of the shaft 25 so that when the shaft 25 is rotated the wiper bar 99 will be driven in a direction to disengage any material that might be inclined to cling to the bars 52 or fingers 62 as they are drawn down between the shaft 25 and wiper bar 99 as best illustrated in Figs. 14, 15.

As seen therein the fingers are arranged to engage the wiper bar 99 which is rotated in a direction to force the material from the bases toward the points of the fingers to clear them of material; and at the same time the gliders 61 are released so that the bars 52 can move on their axes to compensate for any change of position necessary as the fingers engage the rotary bar 99 and are drawn between it and the shaft 25.

It is understood that the chains 53 and 83 can be provided with suitable guards 105, and also that the elevator 20 and cross conveyor 26 can be provided with side boards 106 and 107, respectively. Also it is understood that the fork 41 can be provided with side wings 108 that aid in directing material in swaths, windrows or shocks toward the intake end of the elevator 20.

In Figs. 3, 5 the hay loader is shown in operation. In Fig. 3, a shock of hay 109 is shown on the elevator 20 and arrows indicate the direction it is being moved.

In Fig. 5 a scattered shock of hay 110 is shown as gathered by the fork 41 and directed toward the intake end of the elevator 20. Another shock of hay 111 fully intact is shown about two-thirds the way of the elevator; and still another shock of hay 112 is shown discharged from the elevator 20 onto the cross conveyor 26.

The direction of movement of material as gathered from the ground and transported to a vehicle is illustrated in Fig. 1 by means of the long arrows.

The wagon 85 is driven over a field so that the fork 41 is moved in a direction to glide under a swath, windrow, or shock, and lift the material into position to enter the intake end of the elevator 20 as previously stated; and the material is transported to and up the elevator and from the cross conveyor to the wagon without greatly disintegrating, agitating or breaking up the material to scatter the seed therefrom.

I claim:

1. The hay loader set forth comprising a frame; a main drive shaft attached to said frame; wheels through which said shaft is extended; ratchet differentials forming a forward driving connection between said wheels and shaft; an elevator slide attached to said frame that has intake and discharge ends; a conveyor adapted to move over said slide and carry material from the intake to the discharge end of said slide; a fork pivotally and yieldingly mounted on the forward end of said elevator for lifting material from the ground to the intake end of said slide; a cross conveyor adjacent the discharge end of said slide; spacer bars for attaching said loader to a side of a hay wagon; a draw chain detachably connecting said loader to the hay wagon and said conveyors adapted for actuation by the movement of the wagon.

2. The hay loader set forth comprising an elevator slide having a face and intake and discharge ends; sprocket chains arranged adjacent the side edges of said slide; square bars arranged to extend across said slide; a pivotal connection between said bars and chains; means for holding said bars from rotation while being moved over the face of said slide, and for releasing the same at the discharge end of said slide so that said bars can be rotated on their axes; and said chains being adapted for actuation to move said bars upward over the face of said slide.

3. The hay loader set forth comprising an elevator slide having a face and intake and discharge ends; sprocket chains arranged adjacent the side edges of said slide; spindles carried by said chains; squared bars arranged to extend across said slide and having end bearings adapted to be fitted onto said spindles; gliders adjacent the ends of said bars that are adapted to hold said bars from rotation while being moved over the face of said slide, said gliders adapted to be released at the discharge end of said slide so that said bars can rotate on said spindles; and said chains being adapted for actuation to move said bars upward over the face of said slide.

4. The hay loader set forth comprising an elevator slide having a face and intake and discharge ends; shafts adjacent the ends of said slide; sprocket wheels on said shafts; sprocket chains on said wheels that are arranged adjacent the side edges of said slide; oppositely arranged spindles carried by said chain; squared bars arranged to extend across said slide bearings at the ends of said bars that are adapted to be fitted to said spindles so that said bars can rotate; gliders secured to said bearings that are adapted to hold said bars from rotating while being moved over the face of said slide; said gliders adapted to be released at the discharge end of said slide so that said bars can rotate; and said chains adapted for actuation to move said bars up over the face of said slide.

5. The hay loader set forth comprising an elevator slide having a face, and intake and discharge ends; shafts adjacent the ends of said slide; sprocket wheels on said shafts; sprocket chains on said wheels that are arranged adjacent the side edges of said slide; spindles carried by said chains; bars arranged to extend across the face of said slide; bearings at the ends of said bars that are adapted to be fitted on to said spindles so that said bars can rotate; gliders secured to said bearings that are adapted to hold said bars from rotation while they are being moved over the face of said slide; said gliders adapted to be released so that said bars can be rotated; fingers on said bar that are arranged to extend upward while said bars are moved over the face of said slide; means for actuating said chains to move said bars and fingers upward over the face of said slide; fingers at the intake end of said slide for yieldingly lifting hay from the ground into position to be engaged and carried upward by said bars and fingers; a wiper bar adjacent the discharge end of said slide that is adapted to be rotated so as to remove the hay from said bars and fingers; and a driving connection between said wiper bar and sprocket chains.

6. The hay loader set forth comprising an elevator slide having a face, and intake and discharge ends; upper and lower shafts arranged adjacent the ends of said slide; sprocket wheels on said shafts; sprocket chains on said wheels that are arranged adjacent the side edges of said slide; spindles carried by said chains; bars arranged to extend across said slide; bearings secured to the ends of said bars that are adapted to be fitted onto said spindle so that said bars can rotate; fingers secured to said bars; gliders secured to said bearings that are adapted to hold said bars from rotation as they are moved upward over said slide; said chains adapted for actuation to move said bars and fingers upward over said slide; a fork adjacent the intake end of said slide that is adapted to lift hay from the ground into position to be engaged and carried upward on said slide by said bars and fingers; a square wiper bar arranged adjacent to and across the discharge end of said slide that is adapted to be rotated to remove hay from said bars and fingers; a chain drive connecting said wiper bar with said upper shaft whereby it can be rotated; and means adjacent the discharge end of said slide for releasing said gliders so that said bars can move on their axes so that they can be drawn down between said upper shaft and wiper bar.

7. The hay loader set forth comprising a frame; a wheel support for said frame; an inclined elevator slide supported by said frame that has a face, and intake and discharge ends; upper and lower shafts at the ends of said slide; sprocket wheels on said shafts; sprocket chains on said wheels that are arranged adjacent the side edges of said slide; spindles integral with spaced links in said chains; square bars arranged to extend across said slide; bearings secured to the ends of said bars that are adapted to be fitted to said spindles so that said bars have pivotal movement; fingers secured to said bars; gliders integral with said bearings that are adapted to hold said bars from pivotal movement as they are moved upward over said slide; said chains adapted for actuation to move said bars and fingers upward over said slide; a fork pivotally connected to said frame and arranged adjacent the intake end of said slide that is adapted to lift hay from the ground into position to be engaged by and carried up said slide by said bars and fingers; means at the discharge end of said slide for releasing said gliders so that said bars can have pivotal movement to withdraw said fingers from the hay; a square rotary wiper bar arranged adjacent to and across the discharge end of said slide for wiping said fingers as they are withdrawn from the hay; and a driving connection between said upper shaft and said wiper bar.

In testimony whereof, I have hereunto set my hand at Los Angeles, California, this 9th day of December, 1924.

CHARLES L. WHITCHER.